United States Patent
Lin et al.

(10) Patent No.: US 6,434,589 B1
(45) Date of Patent: Aug. 13, 2002

(54) TELECOMMUNICATIONS JOB SCHEDULING

(75) Inventors: Philip J. Lin, Newton; James D. Mills, Wilmington, both of MA (US)

(73) Assignee: Tellabs Operations, Inc., Lisle, IL (US)

(*) Notice: Subject to any disclaimer, the term of this patent is extended or adjusted under 35 U.S.C. 154(b) by 0 days.

(21) Appl. No.: 09/099,839

(22) Filed: Jun. 19, 1998

(51) Int. Cl.[7] .................................................. G06F 9/00
(52) U.S. Cl. ........................ 709/100; 709/104; 709/224; 709/226
(58) Field of Search ................................ 709/100, 101, 709/102, 103, 104, 105, 106, 107, 108, 224, 226

(56) References Cited

U.S. PATENT DOCUMENTS

| | | | |
|---|---|---|---|
| 4,646,286 A | | 2/1987 | Reid et al. ..................... 370/16 |
| 4,837,760 A | | 6/1989 | Reid et al. ..................... 370/16 |
| 5,029,158 A | | 7/1991 | Reid et al. ................. 370/13.1 |
| 5,239,673 A | * | 8/1993 | Nalorjan ..................... 455/426 |
| 5,742,825 A | * | 4/1998 | Mathur et al. .............. 709/329 |
| 5,826,081 A | * | 10/1998 | Zolnowsky ................. 709/103 |

OTHER PUBLICATIONS

Eriksson, H., "Capacity Improvement by Adaptive Channel Allocation", Globecom 1988, Hollywood, FL, Nov. 1988.

Zhang, M. et al., "Comparisons of Channel–Assignment Strategies in Cellular Mobile Telephone Systems", IEEE Trans. on Vehicular Technology, vol. 38, No. 4, Nov. 1989.

Del Re, E. et al., "Handover and Dynamic Channel Allocation Techniques in Mobile Cellular Networks", IEEE Trans. on Vehicular Technology, vol. 44, No. 2, May 1995.

Zander, J. et al., "Asymptotic Bounds on the Performance of a Class of Dynamic Channel Assignment Algorithms" IEEE Journal on Sel. Areas in Comm., vol. 11, No. 6, Aug. 1993.

Zander, J. et al., "Capacity Allocations and Channel Assignment In Cellular Radio Systems Using Reuse Partitioning", Elect. Letters, vol. 28, No. 5, Feb. 1992.

Nettleton, R. et al., "A High Capacity Assignment Method For Cellular Mobile Telephone Systems", 39th IEEE Vehicular Technology Conf., San Francisco, CA, May 1989.

Siller, Jr. et al., "SONET/SDH A Sourcebook of Synchronous Networking" Section 3, pp. 129–207, IEEE Press Marketing, 1996.

\* cited by examiner

Primary Examiner—Majid Banankhah
(74) Attorney, Agent, or Firm—Fish & Richardson PC (57) ABSTRACT

A computer-based method of scheduling jobs for processing by resources. The method proceeds by identifying resources capable of processing a first job and selecting a second job for rescheduling from jobs currently being processed by the identified resources such that the second job can be processed by resources other than the identified resources. Scheduling further includes scheduling the first job for processing by the resource currently processing the second job and rescheduling the second job. The method used to schedule the first job may be repeated to reschedule the second job and any jobs displaced by rescheduling the second job.

28 Claims, 6 Drawing Sheets

Microfiche Appendix Included
(1 Microfiche, 59 Pages)

TELECOMMUNICATIONS JOB SCHEDULING

REFERENCE TO MICROFICHE APPENDIX

A microfiche appendix consisting of 59 frames is included as part of the specification. The appendix includes material subject to copyright protection. The copyright owner does not object to the facsimile reproduction of the appendix, as it appears in the Patent and Trademark Office patent file or records, but otherwise reserves all copyright rights.

BACKGROUND OF THE INVENTION

This invention relates generally to telecommunications job scheduling.

Many systems can be characterized as offering different classes of resources that process different classes of jobs. These resource classes often vary in their job processing capabilities. Similarly, job class characteristics can vary such that only a restricted set of resource classes can process a particular job. Scheduling allocates a particular resource for processing a job. The pairing of job to resource can strongly affect system performance. That is, different scheduling assignments can result in faster or slower processing of a incoming job.

SUMMARY OF THE INVENTION

In general, in one aspect, the invention features a computer-based method of scheduling a first job for processing by a resource. The method proceeds by identifying resources capable of processing the first job and selecting a second job for rescheduling from jobs currently being processed by the identified resources such that the second job can be processed by resources other than the identified resources. Scheduling further includes scheduling the first job for processing by the resource currently processing the second job and rescheduling the second job.

The invention may continue by identifying resources capable of processing the second job and selecting a third job for rescheduling from jobs currently being processed by the identified resources such that the third job can be processed by resources other than the identified resources. The scheduling can proceed by scheduling the second job for processing by the resource currently processing the third job and rescheduling the third job.

The system may select a job for rescheduling by selecting the job that can be processed by the greatest number of resources other than the identified resources. Enforcement of the scheduling may be contingent upon successful rescheduling.

In one example implementation the resources are communication frequencies while the jobs are wireless communication transmitted over the communication frequencies. In another example implementation the resources are communication subchannels while the jobs are information being transmitted by the communication subchannels having corresponding priority ratings.

The invention may offer one or more of the following advantages. The invention dynamically determines a new scheduling configuration that can both continue processing jobs currently being processed and begin processing a new job if any such configuration exists. Further, switching to the new configuration requires few hand-offs of jobs between processors. Additionally, the system can ensure that a job being processed is not terminated or delayed once some resource has begun processing the job.

DESCRIPTION OF THE PREFERRED EMBODIMENTS

Figure 1A:
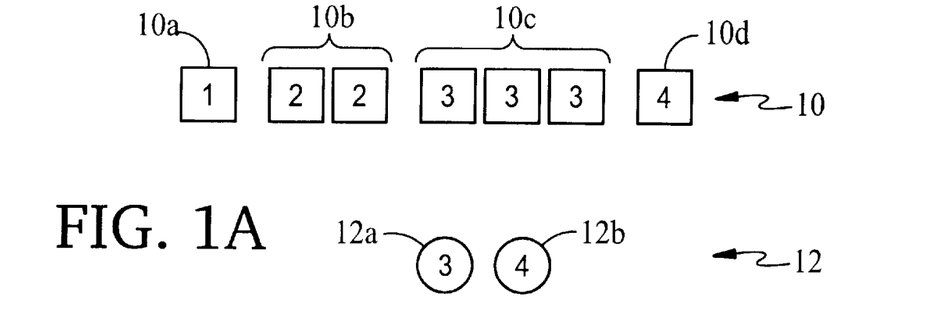
FIGS. 1A–1C are diagrams illustrating job scheduling.
Figure 1B:
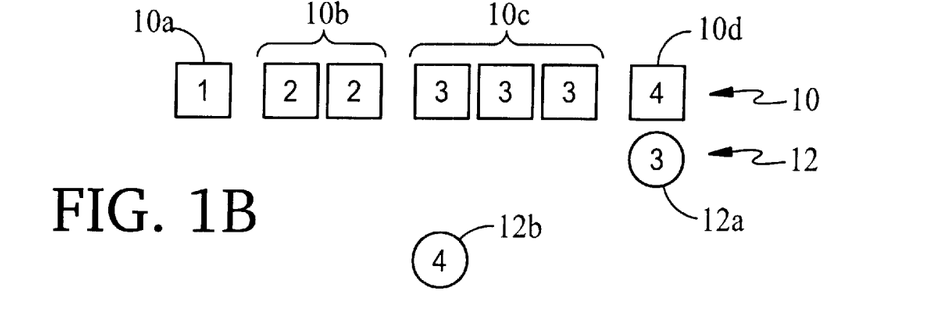
Figure 1C:
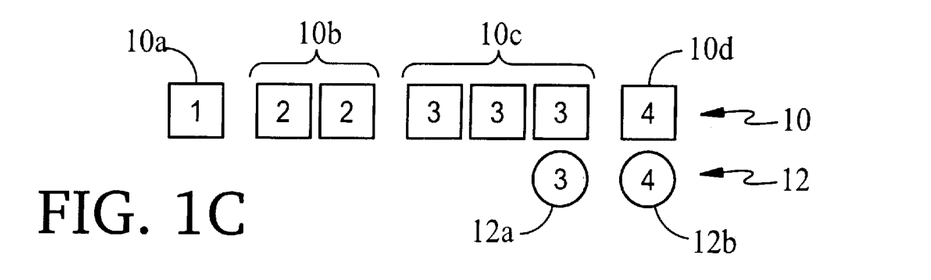
Figure 2:
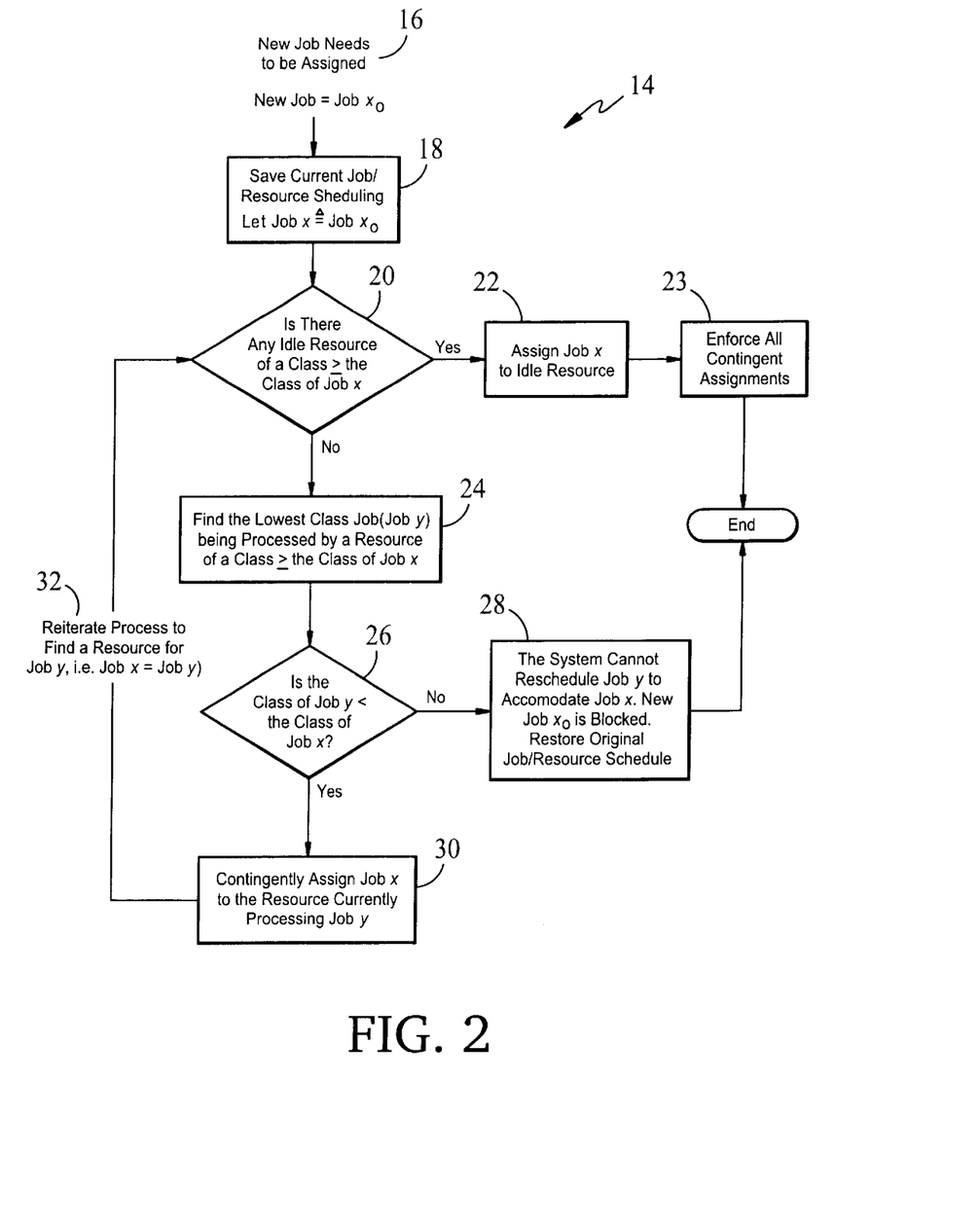
FIG. 2 is a flowchart of a job scheduling system.

Referring to FIGS. 1A–1C, many systems feature different classes of resources $10a$–$10d$ that process different classes of jobs $12a$–$12b$. Resource classes $10a$–$10d$ vary in their job $12$ processing capabilities. Similarly, job $12a$–$12b$ characteristics can vary such that only a restricted set of resource classes $10a$–$10d$ can process a particular job $12a$–$12b$. Scheduling assigns a job $12$ to a particular resource $10$ for processing. This assignment can strongly affect system performance.

As shown in FIGS. 1A–1C, resources $10$ and jobs $12$ belong to different numbered classes (e.g., "1" to "4"). The class numbering notation merely indicates a resource's $10$ skillfulness at processing a job $12$ or a job's $12$ difficulty. Resources $10$ belonging to higher numbered classes offer more skillful job processing. Jobs $12$ of a particular numbered class must be processed by resources of the same or higher class. For example, a job $12a$ of class "3" can only be processed by a resource of class "3" or "4". Expressed differently, a resource of class "4" $10a$ can process jobs of class "1", "2", "3" $12a$, or "4" $12b$, while the least skillful resources of class "1" $10a$ can only process the least difficult jobs of class "1" (not shown).

As shown in FIG. 1A, two jobs $12a$ and $12b$ await scheduling. As shown in FIG. 1B, a resource of class "4" $10d$ has been scheduled to process a job of class "3" $12a$. Unfortunately, this scheduling blocks assignment of the job of class "4" $12b$, since the job of class "4" $12b$ can only be processed by a resource $10d$ of class "4". Hence, until resource $10d$ stops processing job $12a$, for example, by completing job $12a$, job $12b$ must wait or abort.

As shown in FIG. 1C, a different scheduling scheme obviates blocking of job $12b$. By assigning job $12a$ to a resource of class "3" $10c$, resource $10d$ can immediately begin processing job $12b$. As resources $10$ process jobs $12a$–$12b$ concurrently, the total amount of time needed to complete both jobs decreases.

The simple scenario played out in FIGS. 1A–1C, however, ignored other factors complicating job scheduling. For example, new jobs $12$ of unpredictable classes may request scheduling at unpredictable intervals.

Referring to the embodiments shown in FIG. 2 and FIGS. 3A–3D, a job scheduling system $14$ iteratively attempts to reassign (i.e., hand off) jobs $12$ currently being processed by resources $10$ to make room for a new job $x_0$ $38$. This dynamic reassignment can reduce job blocking.

Figure 3A:
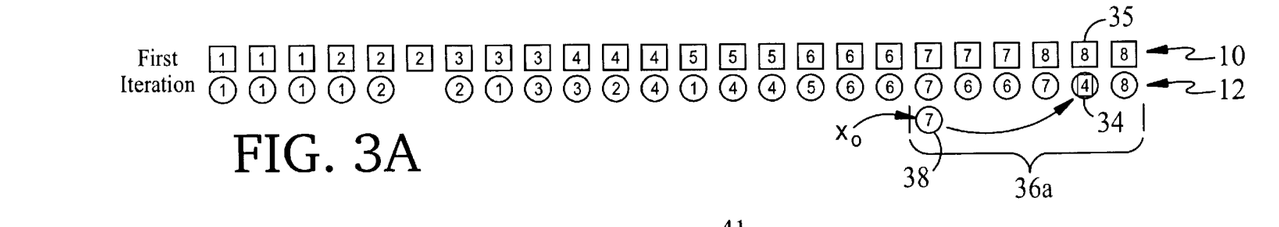
FIGS. 3A–3D are diagrams illustrating how the job scheduling system assigns jobs to resources for processing.

The job scheduling system $14$ begins processing when a new job $38$ requests ($16$) scheduling. As shown in FIG. 3A, a new job $38$ of class "7" requests assignment to a resource for processing. Before trying to adjust the current job scheduling scheme (i.e., the pairing of jobs $12$ with resources 10), the job scheduling system 14 saves (18) a representation of the current scheme to ensure the scheme can be restored should the system's 14 efforts to make room for the new job 38 fail (28).

Initially, the job scheduling system 14 checks (20) to see if any idle resources can handle the new job 38. For example in FIG. 3A, only resources of class "7" or "8" 36*a* can process a job of class "7". As shown, jobs 12 have already been assigned to all resources 36*a* capable of processing the new job 38. If the job scheduling system 14 identified an idle resource of sufficient capability, the system 14 could simply assign the new job to the idle resource (22). Thereafter, the system 14 ends (25) and is ready to handle another new job. request for processing.

In the absence of an idle processor (20), the system 14 identifies (26) the lowest class job 34 being handled by a resource capable of processing the new job 38. As shown in FIG. 3A, a job of class "4" 34 has been assigned to a resource 35 of class "8". The system 14 identifies the lowest class job 34 since a lower class resource, if idle, could process the identified job 34.

After identifying a job 34 that potentially can be reassigned to make room for the new job 38, the system 14 determines (26) whether the identified job 34 belongs to a class that can be handled by resources other than the resources 36*a* that can handle the new job 38. If the identified job 34 can only be processed by the same resources 36*a* or a subset of the same resources 36*a* as the new job 38, the system 14 stops (28) its rescheduling efforts, since the system 14 can no more assign the identified job 34 to an idle processor than the system 14 could assign the new job 38. Thus, despite system 14 efforts to make room for the new job 38, the new job 38 is nevertheless blocked.

As shown in FIG. 3A, however, the system 14 has identified a job 34 of class "4" which can be processed by a resource (or resources) 36*b* other than the resources 36*a* that can process the new job 38. The system 14 makes a contingent assignment (30) of the new job 38 to the resource 35 currently processing the identified job 34. The system 14 will only enforce the contingent reassignment (i.e., handsoff jobs to different resources) if the system can continue to process all jobs being processed prior to the new job's 38 request for processing. That is, the system 14 never terminates a job once a resource has started processing a job.

Figure 3B:
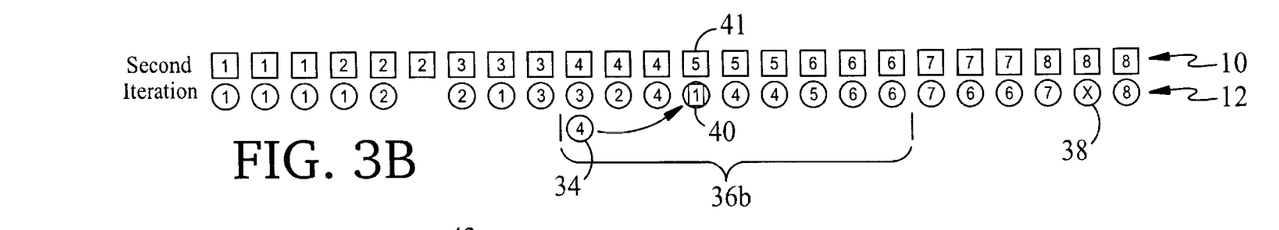

After making the contingent assignment (30) of the new job 38 to a resource 35, the system 14 must find a resource to process job 34 whose resource 35 has contingently been assigned to the new job 38. The system 14 attempts to find a resource for job 34 by repeating the scheduling process performed for the new job 38. That is, the system 14 searches for idle resources 36*b* that can handle the job 34 contingently displaced by the new job 38. As shown in FIG. 3B, the job 34 of class "4" could be processed by resources of class "4", "5", "6", "7", or "8". The previous iteration, however, determined that no idle resources 36*a* existed in classes "7" or "8". The resources 36*a* already checked for idle processors form an upperbound that enables the system 14 to restrict its search (30) to resources of class "4", "5", and "6" (36*b*). Again, the system 14 identifies (24) the lowest class job 40 processed by the resources 36*b* capable of handling the job 34 the system 14 is trying to schedule. Since the lowest class job 40 of class "1" can be handled by resources 36*c* other than those 36*b* that can handle the displaced job 34, the system 14 can make a contingent assignment of job 34 to the resource 41 that previously processed job 40. The system 14 next tries to find a resource to process job 40, requiring another iteration of the job scheduling process 14.

Figure 3C:
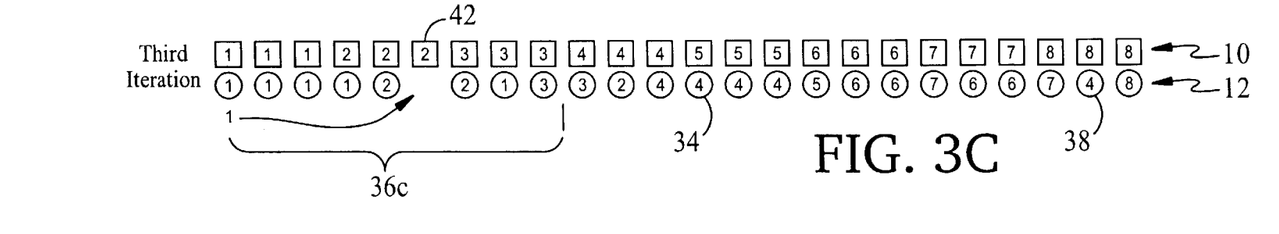

As shown in FIG. 3C, the system 14 finally finds an idle resource 42 capable of handling the newly displaced job 40. After assigning (22) job 40 to the idle resource 42, the system 14 can actually enforce (23) the contingent assignments made during the different iterations of the scheduling process. On the other hand, had the system 14 failed to find a resource capable of handling the newly displaced job 40, the system 14 would not enforce any contingent assignments made during the previous iterations and would restore the job/resource scheduling that existed prior to the system 14 attempt to make room for the new job 38. The new job 38 would be blocked and is would have to wait for a resource to finish processing before being processed.

Figure 3D:
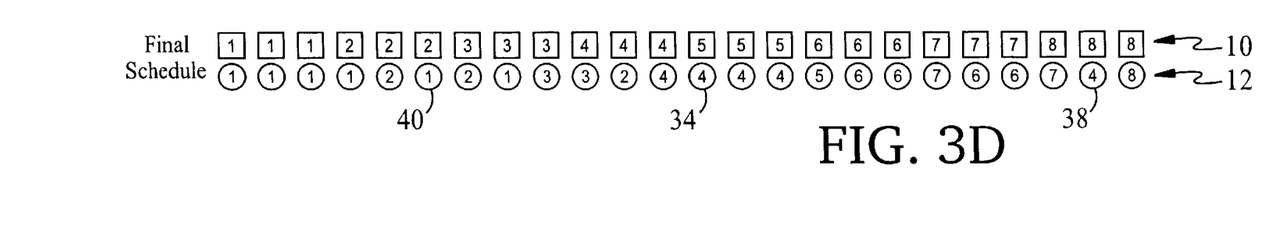

To summarize, as shown in FIG. 3D, the system 14, rather than blocking new job 38, has found a resource capable of processing the new job 38 by reassigning the jobs currently being processed. The system 14 did so with few hand-offs of jobs between resources 10. As illustrated in FIGS. 3A–3D, the system 14 is work conserving. That is, the system 14 will always find a scheduling configuration that will accommodate a new job request providing such a configuration exists.

It should be noted that the system 14 is not limited to the number of classes or the number of resources featured in FIGS. 3A–3D. Similarly, the designations of the classes and the cardinality of the resources in each class FIGS. 3A–3D were arbitrarily selected.

Figure 4:
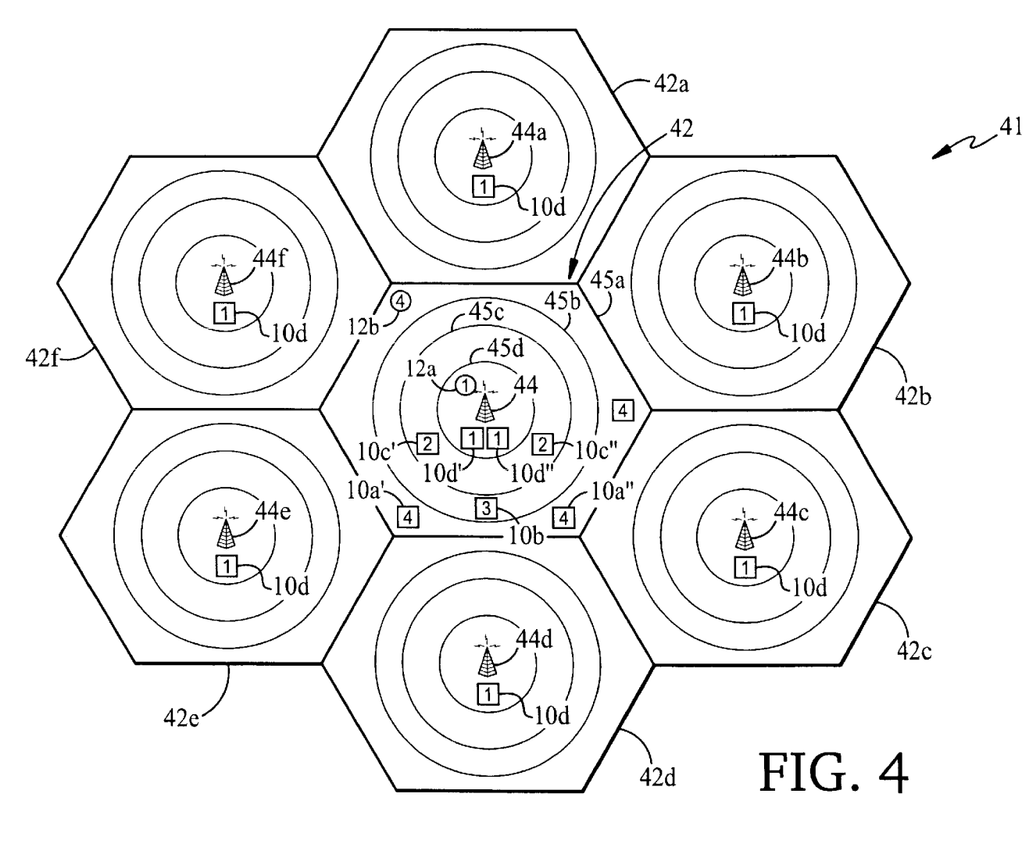
FIG. 4 is a diagram of a wireless communication system that uses the job scheduling system of FIG. 2.

The job scheduling system 14 described can improve the performance of various telecommunications systems. For example, the job scheduling system 14 can reduce the number of calls denied service by a wireless telecommunication system. Referring to FIG. 4, an example wireless communication system 41 includes a base station 44 that serves remote terminals 12*a*5 12*b* (e.g., a cellular phone) in a hexagonal cell 42. As shown, the cell 42 uses a fixed reuse partitioning (FRP) scheme that features different overlapping partitions 45*a*–45*d*. For example, the innermost partition 45*d* of cell 42 closely encircles base station 44. The outermost partition 45*a* traces the hexagonal cell 42 outline and encloses other cell partitions 45*b*–45*d*.

Each partition 45*a*–45*d* offers several communication frequencies. For example, the innermost partition 45*d* offers frequencies $10d'$, $10d''$, while the outermost partition 45*a* offers frequencies $10a'$–$10a'''$. A partition frequency $10a'$–$10d''$ can handle communication in its corresponding partition and any included partition. That is, channel frequencies $10d'$ and $10d''$ can only serve remote terminals 12*a* within the region bounded by innermost partition 45*d*. Frequencies $10a'$–$10a'''$, corresponding to the outermost partition 45*a*, can handle communication with any remote terminal 12*a* or 12*b* located within the cell 42.

A frequency can be considered a resource having a class corresponding to the largest partition the frequency can serve. For example, frequencies $10a'$–$10a'''$, capable of serving any of the four cell partitions 45*a*–45*d*, offer resources of class "4". Frequency 10*b*, serving three cell partitions 45*b*–45*d*, offers a resource of class "3", and so forth.

Communication with a remote terminal in a cell 42 can be considered a job 12*a*–12*b* having a class corresponding to the partition where the remote terminal is located. For example, remote terminal 12*a* is located in the innermost partition 45*d*, and forms a job class of "1". Remote terminal 12*b* is located in the outermost partition 45*a* and forms a job of class "4".

The wireless communication system described above has, for the purpose of this illustration, the same components and constraints handled by the job scheduling process 14 described above. That is, a frequency of a given class can only handle remote terminal jobs of a lesser or equal class. For example, the frequency of class "4" can handle any remote terminal job located in the cell 42. While a frequency of class "1" can only handle a remote terminal job located within the partition 45d encircling the base station 44.

When a wireless communication system using the job scheduling system 14 receives a request for communication, the scheduling system 14 attempts to dynamically reschedule (i.e., change a job's communication frequency) on-going remote terminal jobs to make room for the requesting remote terminal job without stopping any on-going communication. Using the job scheduling system 14 to handle remote terminal job scheduling reduces job blocking without interrupting on-going job processing. That is, the system 14 serves new calls more quickly and does not disconnect on-going calls. Further, the system 14 uses relatively few hand-offs to shift on-going communication to other frequencies.

Figure 5:
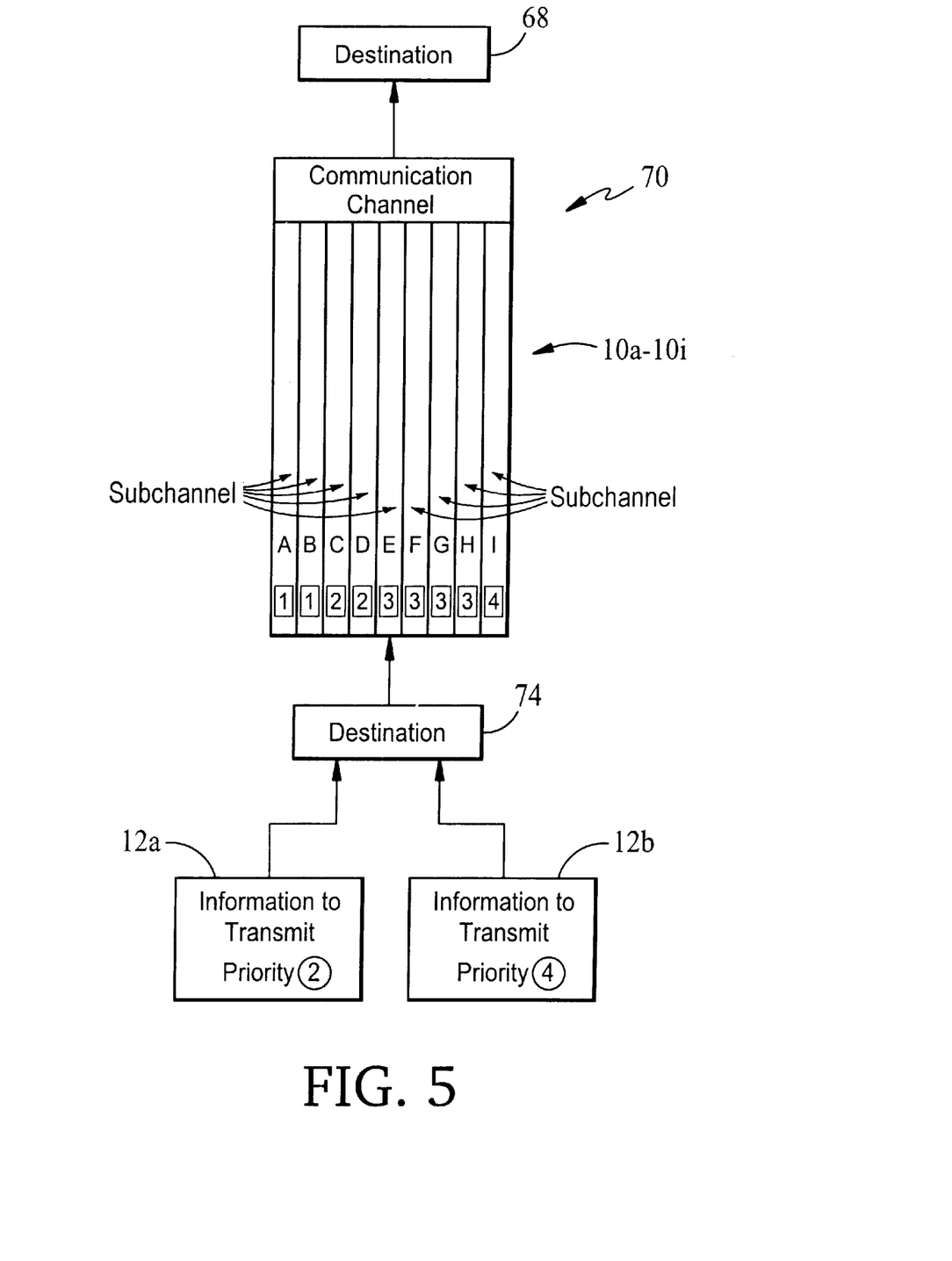
FIG. 5 is a diagram of a prioritized communication scheme that uses the job scheduling system of FIG. 2.

Referring to FIG. 5, the job scheduling system 14 can also improve prioritized communication between a source 74 and a destination 68. Various multiplexing techniques can segment a communication channel 70 into subchannels 10a–10i for transmitting information 12a–12b. For example, time division and frequency division multiplexing can both divide a channel into different subchannels.

Each subchannel 10a–10i and piece of information 12a–12b has an assigned priority rating. Arbitrarily, a lower priority rating indicates more urgent communication. For example, information 12a having a priority rating of "2" has priority over information 12b having a priority rating of "4".

Source 74 schedules information for transmission over subchannels 10a–10i such that a subchannel can only carry sets of information 12a–12b having a priority less than or equal to the assigned priority of the subchannel 10a–10i. For example, subchannel 10i, having a priority rating of "4", can process information having a priority rating of "1", "2", "3" or "4". While subchannel 10a, having a priority rating of "1", is reserved for transmitting urgent information having a priority rating of "1".

Each subchannel can be considered a resource belonging to a class corresponding the subchannel's priority rating. Likewise, each set of information can be considered a job belonging to a class corresponding to the information's priority rating. Incorporating the job scheduling system 14 into the source 74 enables the source 74 to dynamically reschedule information transmission over subchannels using the process described in regard to FIGS. 2 and 3A–3D. Thus, the source 74 can often allocate a subchannel for an urgent information transmission request without interrupting on-going information transmission.

The communication environment shown in FIG. 5 offers the job scheduling system 14 implementation flexibility. For example, instead of physically handing-off a job from one resource to another resource, the system 14 can simply swap the priority ratings of the respective resources. Additionally, the system 14 can dynamically alter the priority ratings of subchannels based on the distribution of communication requests received.

It will be understood by those of skill in the art, that the benefits of the job scheduling system of the present invention extend beyond and may be realized in other than the systems specifically shown and described herein.

Figure 6:
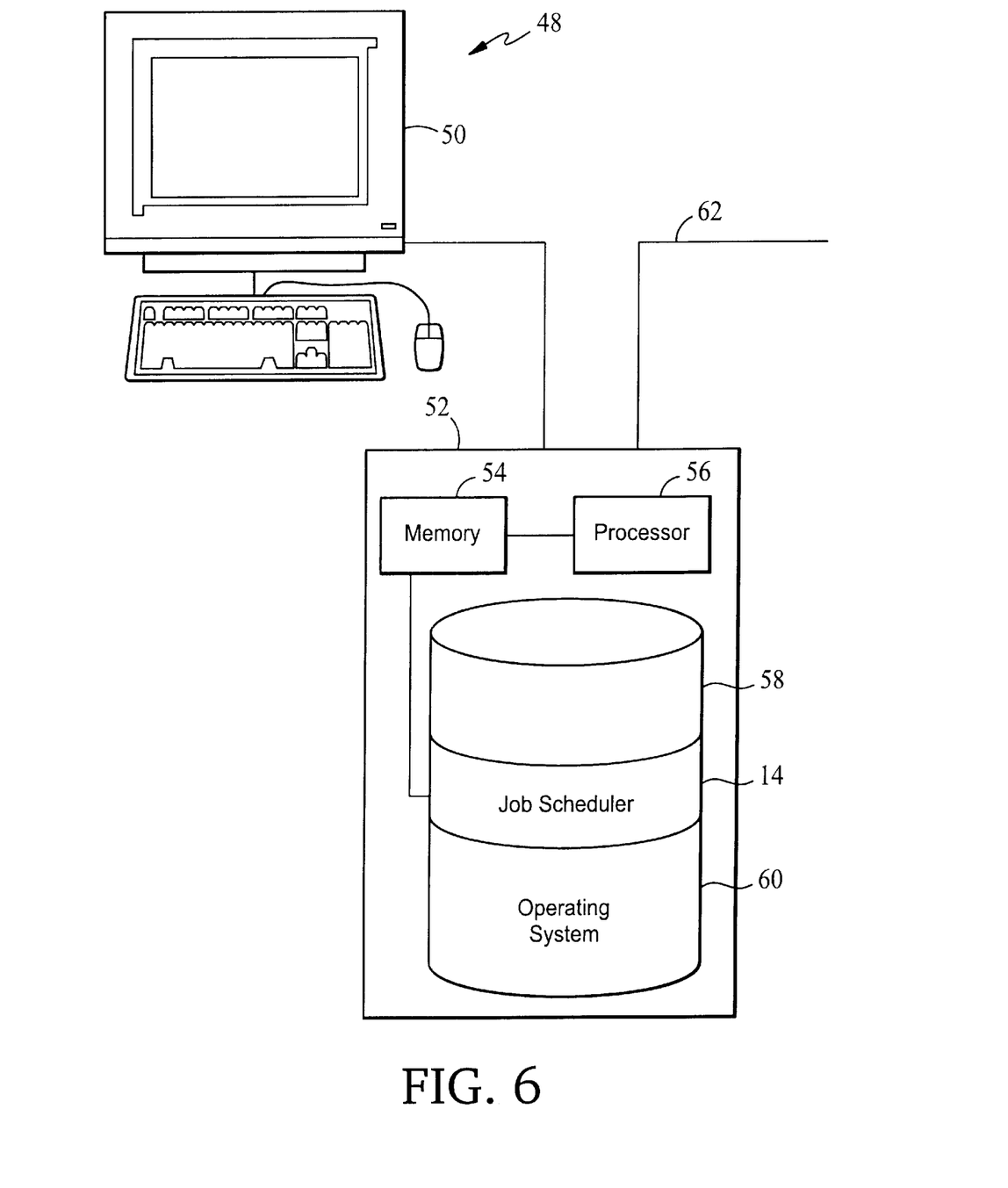
FIG. 6 is a diagram of a computer platform suitable for running the job scheduling system of FIG. 2.

Referring to FIG. 6, for example, the job scheduling system 14 can be implemented on computer platform 48 or other hardware capable of executing programming instructions. The computer platform 48 can include a display 50 to monitor job scheduling and a digital computer 52. The digital computer 52 includes memory 54, a processor 56, a mass storage device 58, and other customary components such as a memory bus and peripheral bus (not shown). The platform 48 may further include a connection 62 to other equipment such as, for example, a wireless communication system base station.

Mass storage device 58 (e.g., a hard disk, floppy disk, CD-ROM, etc.) stores the job scheduling system 14 instructions and potentially an operating system 60. Preferably, the job scheduling system 14 uses recursive programming to implement the scheduling process described in conjunction with FIG. 2.

While preferably implemented in firmware, the invention may also be implemented in computer hardware, software, or a combination thereof. The implementation may include a computer program product tangibly embodied in a computer program storage device for execution by a computer processor. Implementation of methods of the invention may include execution of method steps by a computer processor under control of a stored program executed by the processor from a randomly accessible program stored to perform the functions of the invention by operating on input data and generating output. Suitable processors include, by way of example, both general and special purpose microprocessors. Generally, a processor will receive instructions and data from a read-only memory and/or a random access memory. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks; magneto-optical disks; and CD-ROM disks.

What is claimed is:

1. A computer-based method of scheduling a first telecommunications job for processing by one of a plurality of telecommunications resources, the method comprising:
   identifying telecommunications resources capable of processing the first telecommunications job;
   selecting a second telecommunications job for rescheduling from telecommunications jobs currently being processed by the identified telecommunications resources, the second telecommunications job being able to be processed by telecommunications resources other than the identified telecommunications resources;
   scheduling the first telecommunications job for processing by the telecommunications resource currently processing the second telecommunications job; and
   rescheduling the second telecommunications job for processing by a telecommunications resource other than the identified resources,
   wherein scheduling comprises scheduling contingent upon successful rescheduling.

2. The computer-based method of claim 1 further comprising:
   identifying telecommunications resources capable of processing the second telecommunications job;
   selecting a third telecommunications job for rescheduling from telecommunications jobs currently being processed by the identified telecommunications resources, the third telecommunications job being able to be processed by telecommunications resources other than the identified telecommunications resources;

scheduling the second telecommunications job for processing by the telecommunications resource currently processing the third telecommunications job; and rescheduling the third telecommunications job for processing by a telecommunications resource other than the identified resources capable of processing the second telecommunications job.

3. The computer-based method of claim 1, wherein selecting a telecommunications job for rescheduling comprises selecting a telecommunications job that can be processed by the greatest number of telecommunications resources other than the identified telecommunications resources.

4. The computer-based method of claim 1, wherein the telecommunications resources comprise communication frequencies and the telecommunications jobs comprise wireless communication transmitted over the communication frequencies.

5. The computer-based method of claim 1, wherein the telecommunications resources comprise communication subchannels and the telecommunications jobs comprise information being transmitted over the communication subchannels.

6. The computer-based method of claim 5, wherein the subchannels and information being transmitted have corresponding priority ratings.

7. A computer-based method of scheduling a new telecommunications job for processing by one of a plurality of telecommunications resources, the method comprising:

scheduling the new telecommunications job for processing by a capable telecommunications resource currently processing another telecommunications job;

scheduling other telecommunications jobs currently being processed by telecommunications resources to free the capable telecommunications resource for processing the first telecommunications job; and scheduling by iteratively identifying telecommunications resources capable of processing a first job;

determining whether an identified telecommunications resource is idle; if so, assigning the first telecommunications job for processing by the idle telecommunications resource; otherwise:

selecting a second telecommunications job from telecommunications jobs currently being processed by the identified telecommunications resources, the second telecommunications job being able to be processed by telecommunications resources other than the identified telecommunications resources;

assigning the first telecommunications job for processing by the telecommunications resource currently processing the second telecommunications job; and scheduling the second telecommunications job for processing by a telecommunications resource other than the identified resources.

8. The computer-based method of claim 7, wherein selecting a telecommunications job for rescheduling comprises selecting a telecommunications job that can be processed by the greatest number of telecommunications resources other than the identified telecommunications resources.

9. The computer-based method of claim 7, wherein scheduling comprises scheduling contingent upon successful rescheduling.

10. The computer-based method of claim 7, wherein identifying telecommunications resources capable of processing a telecommunications job comprise identifying telecommunications resources other than those identified by previous scheduling iterations.

11. The computer-based method of claim 7, wherein the telecommunications resources comprise communication frequencies and the telecommunications jobs comprise communication from remote terminals transmitted over the communication frequencies.

12. The computer-based method of claim 11, wherein the communication frequencies comprise wireless communication frequencies and the remote terminals comprise wireless remote terminals.

13. The computer-based method of claim 7, wherein the telecommunications resources comprise communication subchannels and the telecommunications jobs comprise information being transmitted over the communication subchannels.

14. A computer-based method of handling a request by a remote terminal for processing of a communication job by one of a plurality of frequency resources, the method comprising:

identifying frequency resources capable of serving the requesting communication job;

selecting a communication job for rescheduling from the communication jobs currently being served by the identified frequency resources, the selected communication job being able to be served by a frequency resource other than the identified frequency resource;

scheduling the requesting communication job for processing by the resource currently processing the selected communication job; and rescheduling the selected communication job for processing by a resource other than the identified resources.

15. The method of claim 14, wherein the communication frequencies comprise wireless communication frequencies and the communication jobs comprise wireless communication jobs.

16. The method of claim 14, wherein the communication frequency resources comprise frequencies in a frequency reuse partitioning scheme.

17. A computer-based method of handling a request for transmission of an information transmission job over one of a plurality of communication subchannel resources, the method comprising:

identifying subchannel resources capable of serving the requesting information transmission job;

selecting an information transmission job for rescheduling from the information transmission jobs currently being served by the identified communication subchannel resources, the selected information transmission job being able to be served by a communication subchannel resource other than the identified communication subchannel resource;

scheduling the requesting information transmission job for processing by the communication subchannel resource currently processing the selected information transmission job; and rescheduling the selected information transmission job for processing by a communication subchannel resource other than the identified resources.

18. The method of claim 17, wherein the information transmission jobs and the communication subchannel resources have corresponding priority class ratings.

19. The method of claim 18, wherein rescheduling comprises switching the priority class ratings of communication subchannel resources.

20. The method of claim 17, wherein the communication subchannels comprise portions of a multiplexed signal.

21. A computer program product for scheduling a first telecommunications job for processing by one of a plurality of telecommunications resources, the product disposed on a computer readable medium and comprising instructions for causing a computer to:

identify telecommunications resources capable of processing the first telecommunications job;

select a second telecommunications job for rescheduling from telecommunications jobs currently being processed by the identified telecommunications resources, the second telecommunications job being able to be processed by telecommunications resources other than. the identified telecommunications resources;

schedule the first telecommunications job for processing by the telecommunications resource currently processing the second telecommunications job; and reschedule the second telecommunications job for processing by a telecommunications resource other than the identified resources, wherein the scheduling is contingent upon successful rescheduling.

22. The computer program product of claim 21, further comprising instructions for causing a computer to:

identify telecommunications resources capable of processing the second telecommunications job;

select a third telecommunications job for rescheduling from telecommunications jobs currently being processed by the identified telecommunications resources, the third telecommunications job being able to be processed by telecommunications resources other than the identified telecommunications resources;

schedule the second telecommunications job for processing by the telecommunications resource currently processing the third telecommunications job; and reschedule the third telecommunications job for processing by a telecommunications resource other than the identified resources capable of processing the second telecommunications job.

23. A computer-based method of scheduling a first job for processing by one of a plurality of resources, the method comprising:

identifying resources capable of processing the first job;

selecting a second job for rescheduling from jobs currently being processed by the identified resources, the second job being able to be processed by resources other than the identified resources;

scheduling the first job for processing by the resource currently processing the second job; and rescheduling the second job for processing by a resource other than the identified resources, wherein scheduling comprises scheduling contingent upon successful rescheduling.

24. The computer-based method of claim 23, further comprising:

identifying resources capable of processing the second job;

selecting a third job for rescheduling from jobs currently being processed by the identified resources, the third job being able to be processed by resources other than the identified resources;

scheduling the second job for processing by the resource currently processing the third job; and rescheduling the third job for processing by a resource other than the identified resources capable of processing the second job.

25. The computer-based method of claim 23, wherein selecting a job for rescheduling comprises selecting a job that can be processed by the greatest number of resources other than the identified resources.

26. The computer-based method of claim 23, wherein the resources comprise communication frequencies and the jobs comprise wireless communication transmitted over the communication frequencies.

27. The computer-based method of claim 23, wherein the resources comprise communication subchannels and the jobs comprise information being transmitted over the communication subchannels.

28. The computer-based method of claim 27, wherein the subchannels and information being transmitted have corresponding priority ratings.

* * * * *